Patented Oct. 11, 1949

2,484,621

UNITED STATES PATENT OFFICE 2,484,621

ADDITION PRODUCTS OF CARBON BISULFIDE AND AMINO-METHYLENE-NAPHTHOLS

Albert F. Hardman, Akron, Ohio, assignor to Wingfoot Corporation, Akron, Ohio, a corporation of Delaware No Drawing. Application September 19, 1945, Serial No. 617,443

7 Claims. (Cl. 260—455)

This invention relates to the vulcanization of rubber and, more particularly, to the employment of novel accelerators whereby rapid cures are effected to produce vulcanized rubber products having excellent physical properties. The invention includes the accelerator compounds as well as their use in rubber and the rubber products obtained.

Numerous accelerators of vulcanization are known and various types of vulcanized rubber may be obtained by the use of these accelerators. It has now been discovered that addition products of carbon bisulfide with the reaction products of naphthols, certain secondary amines and formaldehyde are excellent vulcanization accelerators.

It is known that naphthols will react with formaldehyde and dialiphatic amines, in most cases producing well-characterized, crystalline compounds. It has been suggested that these reaction products have an ether structure, as represented by the structural formula

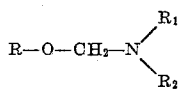

in which R is a naphthyl radical and $R_1$ and $R_2$ are aliphatic groups, which may be linked together to form a cyclic group, as in the piperidyl and morpholyl radicals. However, it is believed that these reaction products are formed according to the following equation, showing the use of beta-naphthol:

(1) 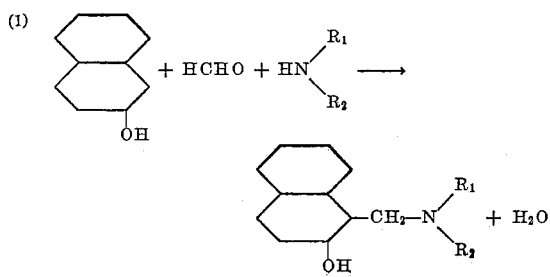

As before, $R_1$ and $R_2$ represent aliphatic groups. There is good experimental evidence tending to prove this latter structure. For example, Caldwell and Thompson (Jour. Am. Chem. Soc. 61, 2354) describe similar reaction products of phenols, formaldehyde and amines as substituted benzyl amines. By subjecting these "benzyl amines" to high pressure hydrogenation, they effect a splitting or fission and obtain a methylated phenol. It is believed to be reasonably certain that the reaction products of naphthols with formaldehyde and dialiphatic amines have the general structure illustrated in Equation (1) and, therefore, they are referred to herein, in the description and claims, as amino-methylene-naphthols. In any event, it should be understood that the only uncertainty is as to the theoretical chemical structure; such products are generally well-characterized crystalline compounds. For example, the reaction product of piperidine with formaldehyde and beta-naphthol is a white, crystalline material melting at 95–96° C., the reaction product of dimethylamine with formaldehyde and beta-naphthol is a white, crystalline product melting at 76° C. and the reaction product of dibenzylamine with formaldehyde and beta-naphthol melts at about 110° C.

The foregoing and analogous compounds are reacted with carbon bisulfide to form addition products which are the accelerators of the invention. The amino-methylene phenols, i. e., compounds derived from phenol, hydroquinone, the cresols and the like, are not included in the invention since it has been found that these compounds do not form addition products with carbon bisulfide. It has also been found that primary amines, such as cyclohexylamine and methylamine, react with formaldehyde and naphthols to form amino-methylene-naphthols and that these compounds form carbon bisulfide addition products. However, such products derived from primary amines are not effective accelerators of vulcanization. Thus, the accelerators of the invention are the carbon bisulfide addition products of the reaction products of a secondary amine, formaldehyde and a naphthol.

The preparation of the accelerator compounds is illustrated by the following examples.

Example 1

Forty-three grams of piperidine and 41 grams of 37% formaldehyde were dissolved in 300 cc. of alcohol, the mixture warming spontaneously to about 50° C. The solution was heated on a steam bath for about ½ hour, 72 grams of beta-naphthol were added and the mixture was refluxed for one hour. On cooling, a mass of crystals formed. These were filtered off, washed with alcohol and dried. This material weighed 84 grams and melted at 94–95° C. It is believed to have been 1-piperidinomethylene-naphthol-2. Twenty-four grams of this product were mixed with 50 cc. of alcohol and 7½ cc. of carbon bisulfide and the mixture was refluxed gently. The original crystals went into solution and within a few minutes a new, white, crystalline material began to separate. At the end of an hour the reaction mass was cooled, then the crystals were filtered off and washed with alcohol. The product thus obtained weighed 30 grams and melted at 143° C. with decomposition. The theoretical sulfur content, calculated on the formula $C_{17}H_{19}ONS_2$, was 20.2%; the sulfur content found by actual analysis was 20.75%.

Example 2

A mixture of 37 grams of diethylamine, 72 grams of β-naphthol, 200 cc. of alcohol and 41 grams of 37% formaldehyde was refluxed for ½ hour and poured into water, a viscous oil being obtained. This oil was washed with hot water and dried by heating to 130° C. and thus purified weighed 75 grams. The oil was then dissolved in 100 cc. of alcohol, 25 cc. of carbon bisulfide were added and the solution was refluxed gently. In a few minutes, white crystals began to separate from the hot solution. At the end of 2 hours, the mass was cooled and the crystals were filtered off and washed with alcohol. It was the addition product of carbon bisulfide and what is believed to be 1-diethylaminomethylene-naphthol-2. The calculated sulfur content, based on the formula $C_{16}H_{19}ONS_2$, was 21%; the sulfur found by actual analysis was 21.15%.

Example 3

One hundred forty-four grams of β-naphthol, 180 grams of a 25% aqueous solution of dimethylamine and 275 cc. of benzene were mixed and 82 grams of 37% aqueous formaldehyde were added thereto with rapid stirring. The temperature rose to 60–65° C. The mixture was stirred for 15–20 minutes and the water layer was then removed by means of a separatory funnel. The benzene solution of the reaction product was washed with water and was then mixed with 70 cc. of carbon bisulfide and placed in a reaction flask fitted with a reflux condenser. The temperature rose from 35° C. to 65° C. in about 20 minutes. The mixture was stirred rapidly and was cooled slightly until the temperature began to fall and was then heated to refluxing temperature for 15 minutes, at which time the hot benzene was full of suspended crystals. The mass was cooled and the crystals were filtered off and washed with benzene. They weighed 270 grams and melted at 136° C. The product was the addition product of carbon bisulfide and what is believed to be 1-dimethylaminomethylene-naphthol-2. The calculated sulfur content, based on the formula $C_{14}H_{15}ONS_2$, was 23.1%; the sulfur found by actual analysis was 23.1%.

Example 4

Ninety-eight and one-half grams of dibenzylamine were mixed with 72 grams of β-naphthol and 300 cc. of alcohol. Forty-one grams of 37% formaldehyde were then added, the mixture became hot, everything went into solution and in a few seconds an oil began to separate. This oil quickly crystallized to produce 157 grams of white crystals melting at 105–110° C. Eighty-nine grams of this product were suspended in 500 cc. of alcohol and 20 cc. of carbon bisulfide were added. The mixture was refluxed gently and the suspended crystals slowly went into solution. After two hours the resulting yellow solution was cooled. The alcohol was then distilled from the resinous product and the remaining viscous liquid was heated to 130° C. in order to dry it. This residue weighed about 100 grams and was tested in rubber without further purification and was found to be a satisfactory non-scorching accelerator.

Example 5

Seventy-two grams of α-naphthol, 88 grams of 25% aqueous dimethylamine and 42 grams of 37% aqueous formaldehyde were mixed and stirred rapidly. The temperature rose to 75° C. and a viscous oil separated. The product was mixed with water and 250 cc. of gasoline, then the water was separated and the gasoline was allowed to evaporate. The dark, viscous oil obtained was placed in a flask with 35 cc. of carbon bisulfide and 100 cc. of benzene and refluxed. Crystals soon began to separate. At the end of ½ hour, the mass was cooled and the crystals were filtered off and washed with benzene. The product weighed 55 grams and melted at 130° C. It was the addition product of carbon bisulfide and what is believed to be 2-dimethylaminoethylene-naphthol-1. The calculated sulfur content, based on the formula $C_{14}H_{15}ONS_2$, was 23.1% while that found by actual analysis was 22.6%.

Example 6

Forty-six and a half grams of ditetrahydrofurfurylamine, 30 grams of β-naphthol, 21 grams of 37% aqueous formaldehyde and 100 cc. of benzene were mixed and refluxed for one hour. The benzene layer was then separated and washed. No crystals formed on cooling. Twenty grams of carbon bisulfide were added to the benzene solution and the mixture was refluxed one hour. Crystals formed on standing over night. Forty grams of product melting at 105–108° C. were obtained.

Example 7

A mixture of 29 grams of β-naphthol, 17 grams of N-(β-cyanoethyl) methylamine, 17 grams of 37% aqueous formaldehyde and 100 cc. of benzene was refluxed one hour and the benzene layer was then separated and washed. Sixteen grams of carbon bisulfide were added and the mixture was refluxed for an hour and a half. Crystals separated on cooling. The product weighed 43.5 grams and melted with decomposition at 151° C. By analysis, it contained 20.4% sulfur and 8.8% nitrogen. Calculated values for the following formula are 20.2% sulfur and 8.8% nitrogen.

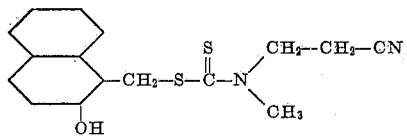

Example 8

A mixture of 14.5 grams of β-naphthol, 15.5 grams of N-(β-cyanoethyl) cyclohexylamine, 8.5 grams of 37% aqueous formaldehyde, 50 cc. of alcohol and 8 grams of carbon bisulfide was refluxed 8 hours and let stand for 48 hours. The crystalline product weighed 22 grams and melted with decomposition at 173–174° C. Analysis showed 16.6% sulfur and 7.3% nitrogen. Calculated values for the following formula are 16.7% sulfur and 7.3% nitrogen.

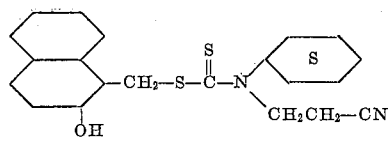

As shown in the foregoing description and examples, many of the products obtained by the reaction of the naphthol with formaldehyde and the amine are crystalline materials but, even when these materials are oily or resinous, the subsequent reaction product with carbon bisulfide is almost invariably crystalline and well-characterized. Therefore, it is not essential that the reaction product of the naphthol with formaldehyde and the amine be completely purified before reaction with carbon bisulfide. Even where the carbon bisulfide product is resinous, as in Example 4, the products are good accelerators and may be used without further purification.

Apparently, temperature conditions are not critical. The reaction with carbon bisulfide takes place readily and the reflux temperature of benzene, i. e., about 80° C., is convenient and satisfactory.

The naphthol, formaldehyde and amine react in equimolecular proportions when monoamines are used but obviously these proportions will vary when polyamines are used since one or more of the amino groups may enter into the reaction. When the products obtained from monoamines are further reacted with carbon bisulfide the final product is the reaction product of equimolecular proportions of the naphthol, formaldehyde, carbon bisulfide and amine but, again, one mol of carbon bisulfide may react for each amine nitrogen when polyamines are used.

Any dialiphatic amino-methylene naphthol may be used in preparing the accelerators of the invention. As shown in the examples, either alpha- or beta-naphthol may be employed in making these dialiphatic amino-methylene naphthols and, in addition, various substituted naphthols may be used, such as those containing alkyl, aryl, aralkyl, alkoxy, aryloxy, amino, chlorine, etc. substituents, which are substantially inert in the reaction and do not adversely affect the properties of the final product when it is used in rubber. Similarly, any dialiphatic amine may be used, including saturated and unsaturated straight-chain and branched-chain aliphatic amines. Also, in addition to amines having open-chain aliphatic radicals, amines containing cycloaliphatic radicals and ring-substituted aliphatic radicals may also be employed, such related compounds being full equivalents of the open-chain aliphatic compounds in the present invention. Thus, included are alkyl radicals, alicyclic radicals, aralkyl radicals and radicals such as furfuryl and tetrahydrofurfuryl. Further representative examples of such amines are N-ethyl cyclohexylamine, difurfurylamine, morpholine, N-isopropyl tetrahydrofurfurylamine, di-n-amylamine, diallylamine, di-ac-tetrahydronaphthylamine, N-ethyl hexahydrophenetidine, N,N'-dicyclohexyl ethylene diamine, etc.

Thus, the amino-methylene naphthols which may be reacted with carbon bisulfide according to the present invention may be represented by the structural formula

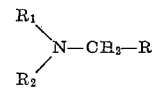

in which $R_1$ and $R_2$ are selected from the group consisting of aliphatic, cycloaliphatic, aralkyl, furfuryl and tetrahydrofurfuryl radicals and R is a naphthol residue. Included are amines in which $R_1$ and $R_2$ are joined by a carbon or heterocyclic linkage to form a single cycloaliphatic radical including the amino nitrogen atom, such as piperidyl, morpholyl and similar radicals.

Thus, the accelerator compounds may also be defined as the addition product of carbon bisulfide and an amino-methylene-naphthol in which the amino-methylene group has the structural formula

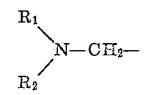

in which $R_1$ and $R_2$ are selected from the group consisting of aliphatic, cycloaliphatic, aralkyl, furfuryl and tetrahydrofurfuryl radicals.

The accelerator compounds may also be prepared by other methods. For example, if desired, the amine, formaldehyde, naphthol and carbon bisulfide may be mixed and reacted simultaneously. Alternatively, the amine and carbon bisulfide may be reacted to form a dithiocarbamate which is then reacted with formaldehyde and the naphthol. The following example illustrates the latter procedure.

Example 9

Seventeen grams of sodium diethyldithiocarbamate (formed by reacting diethyl amine with carbon bisulfide in the presence of sodium hydroxide), 100 cc. of water, 9 grams of 37% formaldehyde, 14.5 grams of β-naphthol and 9 grams of sodium bicarbonate were mixed and warmed on a steam bath for about half an hour. The solid material melted down and dissolved and then the mass solidified again in hard lumps. This solid was recrystallized from alcohol, 11 grams of white crystals being obtained. The product had the same melting point as the product of Example 2 and a mixture of the two melted without any depression of the melting point, indicating that the two products were the same.

Representative examples of the accelerators of the invention were incorporated into rubber in accordance with the following formula:

| | Parts by weight |
|---|---|
| Rubber | 100.0 |
| Zinc oxide | 5.0 |
| Sulfur | 3.0 |
| Accelerator | 0.5 |

Samples were vulcanized and tested to give the following results:

PRODUCT OF EXAMPLE 1

| Time Mins. at °F. | Tensile, kgs./cm.$^2$ | Ultimate Elg., Percent | Modulus kg./cm.$^2$ 500% |
|---|---|---|---|
| 20/240 | 144 | 865 | 16 |
| 30 | 207 | 700 | 29 |
| 40 | 216 | 745 | 37 |
| 60 | 215 | 720 | 45 |
| 80 | 218 | 710 | 49 |

PRODUCT OF EXAMPLE 2

| | | | |
|---|---|---|---|
| 20/240 | No cure | 820 | 27 |
| 30 | 211 | 780 | 34 |
| 40 | 229 | 760 | 45 |
| 60 | 250 | 735 | 48 |
| 80 | 228 | | |

PRODUCT OF EXAMPLE 3

| | | | |
|---|---|---|---|
| 20/240 | 187 | 860 | 21 |
| 30 | 216 | 765 | 37 |
| 40 | 222 | 725 | 45 |
| 60 | 225 | 720 | 51 |
| 80 | 215 | 715 | 51 |

PRODUCT OF EXAMPLE 4

| | | | |
|---|---|---|---|
| 20/240 | No cure | | |
| 30 | 152 | 855 | 18 |
| 40 | 184 | 835 | 23 |
| 60 | 203 | 815 | 27 |
| 80 | 206 | 795 | 31 |

PRODUCT OF EXAMPLE 5

| | | | |
|---|---|---|---|
| 20/240 | 160 | 885 | 17 |
| 30 | 203 | 755 | 36 |
| 40 | 222 | 745 | 41 |
| 60 | 226 | 725 | 49 |
| 80 | 212 | 725 | 46 |

These test data demonstrate that the accelerators of the invention give rapid cures with excellent physical properties in the vulcanized products. When subjected to a heat plasticity test, none of these accelators showed any tendency to scorch.

The accelerator compounds may also be used in various synthetic rubber-like materials which can be vulcanized in a manner similar to natural rubber, such as copolymers of butadiene-1,3 with styrene, acrylonitrile and the like.

While only preferred forms of the invention have been described in detail, it will be apparent to those skilled in the art that various modifications may be made therein without departing from the scope of the invention as defined in the appended claims.

This application is a continuation-in-part of my co-pending application Serial No. 354,522, filed August 28, 1940, now abandoned.

I claim:

1. The addition product of carbon bisulfide and an amino-methylene-naphthol in which the amino-methylene group has the structural formula

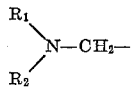

in which $R_1$ and $R_2$ are selected from the group consisting of aliphatic, cycloaliphatic, aralkyl, furfuryl and tetrahydrofurfuryl radicals.

2. The addition product of carbon bisulfide and a dialiphatic amino-methylene-naphhtol.

3. The addition product of carbon bisulfide and a dialkylamino-methylene-naphthol.

4. The addition product of carbon bisulfide and a diaralkylamino-methylene-naphthol.

5. The addition product of carbon bisulfide and 1-diethylaminomethylene-naphthol-2.

6. The addition product of carbon bisulfide and 1-dimethylaminomethylene-naphthol-2.

7. The addition product of carbon bisulfide and 1-dibenzylaminomethylene-naphthol-2.

ALBERT F. HARDMAN.

No references cited.

Certificate of Correction

Patent No. 2,484,621 October 11, 1949

ALBERT F. HARDMAN

It is hereby certified that error appears in the printed specification of the above numbered patent requiring correction as follows:

Column 4, line 46, for "aminoethylene" read *aminomethylene*;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*